US012360908B2

(12) United States Patent
Gracia

(10) Patent No.: US 12,360,908 B2
(45) Date of Patent: Jul. 15, 2025

(54) PREFETCH MECHANISM FOR TIERED STREAMING STORAGE SYSTEMS

(71) Applicant: Dell Products L.P., Round Rock, TX (US)

(72) Inventor: Raul Gracia, Barcelona (ES)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/357,917

(22) Filed: Jul. 24, 2023

(65) Prior Publication Data

US 2025/0036568 A1    Jan. 30, 2025

(51) Int. Cl.
*G06F 12/0875* (2016.01)

(52) U.S. Cl.
CPC ................ *G06F 12/0875* (2013.01)

(58) Field of Classification Search
CPC .................................... G06F 12/0875
See application file for complete search history.

(56) References Cited

U.S. PATENT DOCUMENTS

| | | | |
|---|---|---|---|
| 2015/0227465 A1* | 8/2015 | Sundaram | G06F 3/0611 711/102 |
| 2017/0286305 A1* | 10/2017 | Kalwitz | G06F 12/0862 |
| 2018/0332367 A1* | 11/2018 | Kaitchuck | H04L 65/612 |
| 2020/0327061 A1* | 10/2020 | Tan | G06F 12/0246 |
| 2021/0073134 A1* | 3/2021 | Allu | G06F 11/1458 |
| 2021/0318820 A1* | 10/2021 | Jin | G06F 3/0673 |

* cited by examiner

*Primary Examiner* — Edward J Dudek, Jr.
(74) *Attorney, Agent, or Firm* — Jackson Walker L.L.P.

(57) ABSTRACT

Disclosed systems and methods employ a data prefetch mechanism for tiered streaming storage systems. Disclosed features improve performance and efficiency of batch reads, i.e., read operations that require data imported from a long-term storage service. In at least some embodiments, disclosed systems and methods execute asynchronous, parallel prefetch reads from long-term storage while a reader is performing batch reads. The prefetched data may correspond to the next data required by the reader and, if so, the reader can perform the next read operation without incurring the latency associated with a synchronous read from long term storage. Disclosed systems and methods thereby beneficially improve throughput for streaming batch readers.

18 Claims, 2 Drawing Sheets

PREFETCH MECHANISM FOR TIERED STREAMING STORAGE SYSTEMS

TECHNICAL FIELD

The present disclosure pertains to information handling systems and methods and, more particularly, systems and methods for implementing streaming storage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Streaming storage systems are becoming increasingly popular to manage and store data events in different scenarios, such as Internet of Things (IoT) applications, telecommunications, and edge computing platforms. Streaming storage systems support low latency write operations for small events and read events backed both in real-time and batch.

SUMMARY

Streaming storage systems may include means for reliably storing data in persistent media including, without limitation, hard drives and non-volatile memories (NVMs). Typically, however, conventional streaming storage systems implement a flat storage model that does not provide users with a tiered storage layout in which recent data is stored for a short period of time in a low latency, high performance storage, while least recent data is moved to a long-term storage service achieving high throughput, cost effectiveness, and parallelism. Storing event data in two different tiers creates challenges for reading data from the long-term storage service efficiently, i.e., without a substantial increase in latency, and across different stream reader behaviors, e.g., sequential vs. random reads.

Disclosed streaming storage systems improve the performance and efficiency of batch reads that require data to be imported from a long-term storage service. In at least one embodiment, asynchronous, parallel prefetch reads are executed against the long-term storage system while a reader is performing batch reads. The prefetch reads enable the next data requested by the reader requests to be available without the long delay associated with synchronous reads to long-term storage, thereby improving throughput for streaming batch readers. Prefetch resources may, in at least some embodiments, support heuristics to determine when prefetch reads are performed based on the read patterns of clients.

Disclosed subject matter features a mechanism to prefetch data for tiered streaming storage systems. The mechanism aims at improving the performance and efficiency of batch reads that require data to be imported from a long-term storage service. Disclosed systems execute asynchronous, parallel prefetch reads against the long-term storage system while a reader is performing batch reads. By doing this, the next data the reader requests will likely be already available without involving synchronous reads against long-term storage, for which the reader needs to wait for the reply. This improves throughput for streaming batch readers. In addition, in at least some embodiment, a heuristic is employed to decide whether to perform prefetch reads or not based on the read patterns of clients.

Disclosed systems and methods employ a data prefetch mechanism for tiered streaming storage systems. Disclosed features improve performance and efficiency of batch reads, i.e., read operations that require data imported from a long-term storage service. In at least some embodiments, disclosed systems and methods execute asynchronous, parallel prefetch reads from long-term storage while a reader is performing batch reads. The prefetched data may correspond to the next data required by the reader and, if so, the reader can perform the next read operation without incurring the latency associated with a synchronous read from long term storage. In this manner, disclosed systems and methods beneficially improve throughput for streaming batch readers.

In addition, disclosed systems and methods may implement heuristics to determine when and when not to initiate prefetch reads based on the read patterns of client applications. As a non-limiting example, read prefetching may be triggered, at least in part, based on determining that a particular reader exhibits sequential read behavior as opposed to non-sequential or random read behavior.

Accordingly, in one aspect, a disclosed streaming storage system includes a streaming storage controller to process metadata requests associated with one or more data streams and a segment store to process data requests associated with those data streams. Disclosed streaming storage services may be implemented as tiered streaming storage services in which data requests are processed in conjunction with two or more tiers of storage. In a two-tiered implementation, as an example, the segment store includes first tier storage for storing the most recent portion of ingested data and a second tier for storing the remainder of the ingested data communicatively coupled to the segment store, wherein a storage latency associated with the first tier storage is lower than a storage latency associated with the second tier storage. In an exemplary embodiment, the first tier storage comprises Apache Bookkeeper storage and the second tier storage comprises Apache Hadoop Distributed File System (HDFS) storage.

The streaming storage system may further include a cache to store data being served to a client and at least one segment container to execute storage operations for segments allocated to the segment container. In at least some embodiments, the segment container maintains information indicative of which portions of the allocated segments are stored in the cache, and initiates retrieval of data from the second tier storage when a data request addresses a segment not stored in the first tier storage or the cache.

The segment container may monitor and evaluate data request information, and upon identifying a read prefetch trigger based on the data request information, the segment container may initiate a prefetch of data stored in the second tier storage. The data request information may include, as non-limiting examples, a segment identifier and a reader identifier indicative of a reader associated with a data request.

In at least some embodiments, prefetch reads may be executed asynchronously with respect to processing of data requests.

Evaluation of the data request information may include a determination of whether monitored data requests associated with a particular reader constitute sequential data requests.

In some embodiments, no prefetch trigger occurs when the evaluation determines that monitored data requests are associated with a non-sequential reader. In at least some embodiments, monitored data requests constitute sequential data requests when successive data requests target monotonically increasing stream offsets. Some embodiments may further define sequential data behavior to include a requirement that stream offsets for successive data requests are closer than a predefined prefetch length, i.e., the maximum amount of data transferred during a single prefetch operation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
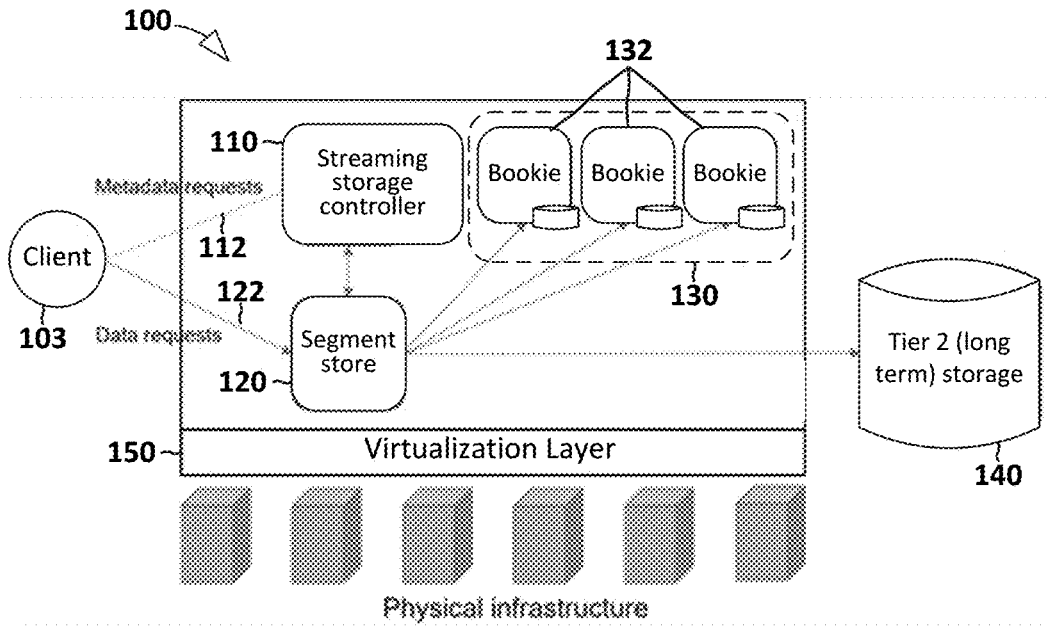
FIG. 1 illustrates an exemplary streaming storage.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAN), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary streaming data platform (SDP) 100 featuring tiered storage in conjunction with data prefetching to improve performance and reduce latency. The SDP 100 illustrated in FIG. 1 may employ at least some features of commercially distributed streaming storage platforms including, as a non-limiting example, a Pravega streaming storage platform from Dell Technologies, designed to support streaming applications that handle large amount of continuously arriving data. As depicted in FIG. 1, SDP 100 is implemented as a cloud-based solution via a virtualization layer 150, e.g., Kubernetes.

The SDP 100 illustrated in FIG. 1 interacts with a client application 103. Client application 103 may include features of a data reader application, referred to herein simply as a reader, and/or a data writer application, referred to herein simply as a writer. Writers use a platform API to ingest collected streaming data from several data sources into SDP 100, which ingests and stores the streams, while reader applications read data from SDP 100.

The SDP 100 illustrated in FIG. 1 includes a streaming storage controller 110 and a segment store 120 to process client application requests. As depicted in FIG. 1, streaming storage controller 110 handles metadata requests 112 from client application 103 while segment store 120 handles data requests 122. Metadata requests 112 may include client requests for information about which segments constitute a stream. For example, because a reader may start processing a stream from the head of the stream or from some point of interest within the stream, a reader may require information indicative of the head of a stream or intermediate points of the stream. On the other hand, because a writer generally appends information to the end of a stream, a writer may require information indicative of the end of the steam. Data requests 122 include requests to read or write actual stream data.

The SDP 100 depicted in FIG. 1 employs a tiered storage architecture including tier-1 storage 130, which may provide low-latency, high performance storage, and tier-2 storage 140, which may provide long-term, cost effective storage. The tier-1 storage 130 of FIG. 1 includes one or more storage servers 132 wherein each storage server 132 may be responsible for processing data requests to data segments allocated to it. In at least one embodiment, each storage server 132 may correspond to an Apache Bookkeeper "Bookie,", which stores ledgers of entries. Those of ordinary skill in the field of streaming data will appreciate, however, that references herein to specific implementations are illustrative rather than restrictive and other implementations may employ different resources.

Figure 2:
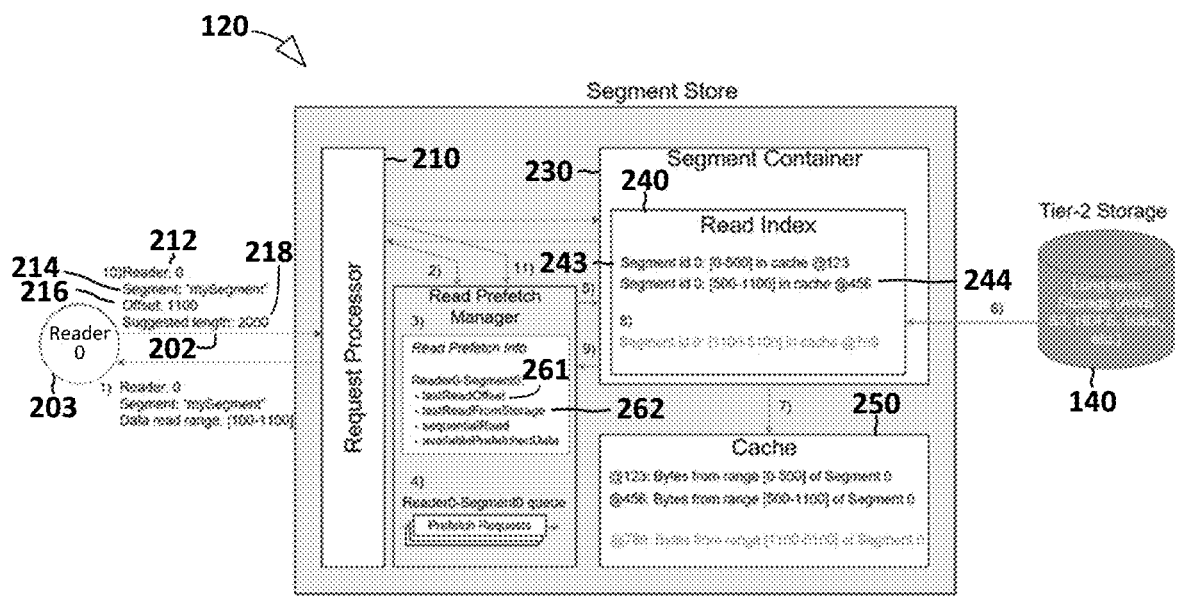
FIG. 2 illustrates a segment store for the streaming storage system of FIG. 1.

Referring now to FIG. 2, additional detail of an exemplary segment store 120 is depicted. The segment store 120 depicted in FIG. 2 includes a request processor 210, a read prefetch manager 220, one or more segment containers 230, each of which includes a read index 240, and cache storage referred to herein simply as cache 250. Request processor 210 manages network connections with clients applications, including the Reader 0 203 depicted in FIG. 2. In the case of a read request, request processor 210 extracts or otherwise obtains information relevant to serve the request including, as non-limiting examples, reader information 212 indicative of the applicable reader, segment information 214 indicative of data to read, offset information 216 at which the read should start, as well as suggested read length information 218.

In at least some embodiments, request processor 210 is responsible for delegating read requests received from reader 203 to a segment container 230. Segment store 120 may run one or multiple segment containers 230, to provide a unit of parallelism. Each segment container 230 is responsible for executing storage or metadata request against segments allocated in it. The segment container 230 illustrated in FIG. 2 includes a read index 240 to track data reads for segments and to indicate what fraction of the data is stored in cache 250. If a read requests data for a segment that is not in cache 250, read index 240 triggers a read against tier-2 storage 140 to retrieve the requested data, storing it in cache 250, where it can be served to client 103.

The cache 250 of segment store 120 provides readers with fast access to data. Cache 250 may be shared across one or multiple segment containers 230. In at least some embodiments, any data served to a client 103 is first stored in cache 250.

An exemplary read request from a reader will now be described for illustrative purposes. The illustrative example presupposes that prior read requests have caused segment container 230 to retrieve, from tier-2 storage 140, byte offsets 0-500 and 500-1000 of a particular segment, referred to as "mySegment" by reader0 (203) and identified as "segment id 0" in read index entries (243, 244) within the read index 240 of segment container 230. After these previous read requests were executed, the two blocks of byte offsets requested are stored in cache 250 and the locations within cache 250 of each byte offset block are reflected in the applicable entries of read index 240. Those of ordinary skill in the field of streaming storage systems will appreciate that the read operations described, if executed by a conventional streaming storage platform, may have resulted in a synchronous retrieval of data from tier 2 storage and a corresponding extended latency interval while the tier 2 storage retrieval executed.

The segment store 120 depicted in FIG. 2 implements prefetching features described below to improve platform performance by reducing the number of times the platform must effectively suspend operations while requested data is retrieved from tier 2 storage. As depicted in FIG. 2, disclosed prefetching features may be implemented in a read prefetch manager 260 and its interactions with other elements of SDP 100. In at least some embodiments, read prefetch manager 260 may be configured to receive certain information on a per-read basis regarding current reads. Read prefetch manger 260 may organize this information and define or comply with one or more rules for how asynchronous prefetch reads are executed. Read prefetch manager 260 may further include logic to determine whether to execute prefetch reads or not for a given stream batch reader.

In at least some embodiments, every time a read reply is served to client 103, request processor 210 notifies the read prefetch manager 260 about the result of the read. Such a notification may contain information relevant to a read reply currently being served to enable RPM 260 to build knowledge about the state and behavior of ongoing reads in the system.

If the client 103 is a new one, or if a new read from a known client is received, RPM 260 may queue a new prefetch request in its internal queue resources 270. In at least one embodiment, prefetch requests are processed asynchronously, i.e., such that they do not block clients, and can be executed in parallel. Queueing a read prefetch request to the queue system of RPM 260 does not imply that an actual prefetch read is executed against long-term storage. There may be one or more preconditions to be satisfied before a read prefetch request is actually executed to retrieve data from tier 2 storage. In at least one embodiment, data prefetching may depend on a determination that the applicable reader is exhibiting sequential access behavior.

Assuming that all the preconditions for a read prefetch request are satisfied, RPM 260 may trigger a read against the segment container 230 for the range of data that the client is likely to read in the near future. In at least some embodiments, a prefetch read may be processed as any other read, thus inducing read index 240 in segment container 230 to trigger reads against tier-2 storage, storing that data in cache 250, and updating its internal indices accordingly. Once a prefetch read completes, RPM 260 may update its internal prefetching information to track the amount of prefetched data for the client and segment. Once the prefetched data is available in cache 250, future reads from the client will not need to wait on long-term storage reads to complete, thus improving latency and throughput.

As part of a reply process to a client, request processor 210 gets notified about the information embedded in the read reply. Every time this occurs, RPM 260 may update the fields for the appropriate entry to track the read activity of the client reading a particular segment. This information may include, as examples, last read offset information 261 and last read length information 262.

In at least some embodiments, a heuristic for determining whether a client 103 is exhibiting sequential behavior or not can be evaluated during the process of updating the internal data structure. Each update on a client's read activity on a given segment may be evaluated to determine whether a client is following a sequential read pattern. In at least one embodiment, sequential behavior is indicated if and only if both of the following conditions are true:

$$\text{currentReadOffset} - \text{lastReadOffset} > 0; \text{ and} \quad (a)$$

$$\text{prefetchReadSize} > \text{currentReadOffset} - \text{lastReadOffset}. \quad (b)$$

The exemplary heuristic first determines whether the applicable client is reading monotonically increasing offsets of a segment. When this precondition is not true, the sequential read parameter is considered to be false, i.e., the reader is not treated as exhibiting sequential read behavior and, therefore, no data prefetching is performed.

The second condition checked by the illustrated heuristic confirms that the applicable client is reading data close to recently read data as a proxy metric to for determining sequential read behavior. In some embodiments, the factor that determines "closeness" is the prefetch read size, which is a configurable parameter that determines the maximum amount of data RPM 260 can retrieve from tier-2 storage 140 when executing a prefetch read. As an example, if the prefetch read size is 1 MB and a client is reading 100 bytes from every 2 MBs, this client would not be determined to have a sequential behavior. In fact, not performing prefetch reads in this case is beneficial for the system, as this is a pathological workload for which prefetching is not effective.

In some embodiments, RPM 260 may also be notified when a prefetch read is completed to update its internal data structure. This may be helpful to track the amount of prefetched data for a given client and segment pair. This may be useful as an additional precondition to decide whether to trigger a prefetch read or not. For example, if the amount of already-prefetched data is enough for a given client, RPM 260 may be prevented from triggering another prefetch read. In this example, it may be better to wait until the already prefetched data is consumed up to a certain point before prefetching more data. For instance, if a client is performing 100-byte reads starting at offset 0 and we have prefetched 4 MBs of data, it may be preferable not to trigger another 4-MB prefetch read until the client has read at least half of the prefetched data (i.e., 2 MBs).

In at least some embodiments, prefetch reads against tier-2 are asynchronous and parallel. Asynchronous prefetch reads beneficially bring data from tier-2 in the background without blocking the client. Parallel prefetch reads enable simultaneously use of prefetching across multiple clients at the same time. To this end, RPM 260 may contains a system of queues partitioned by client and segment pairs. For example, all potential read prefetch operations for a given client and segment pair may be processed sequentially, whereas requests from different clients and segments may be processed in parallel. On every read request, RPM 260 may receive a read prefetch request for the client and segment pair, which is queued at the right queue based on the Client and Segment involved in the read request. The processing of the read prefetch requests is asynchronous and works independently of the client read being executed.

Figure 3:
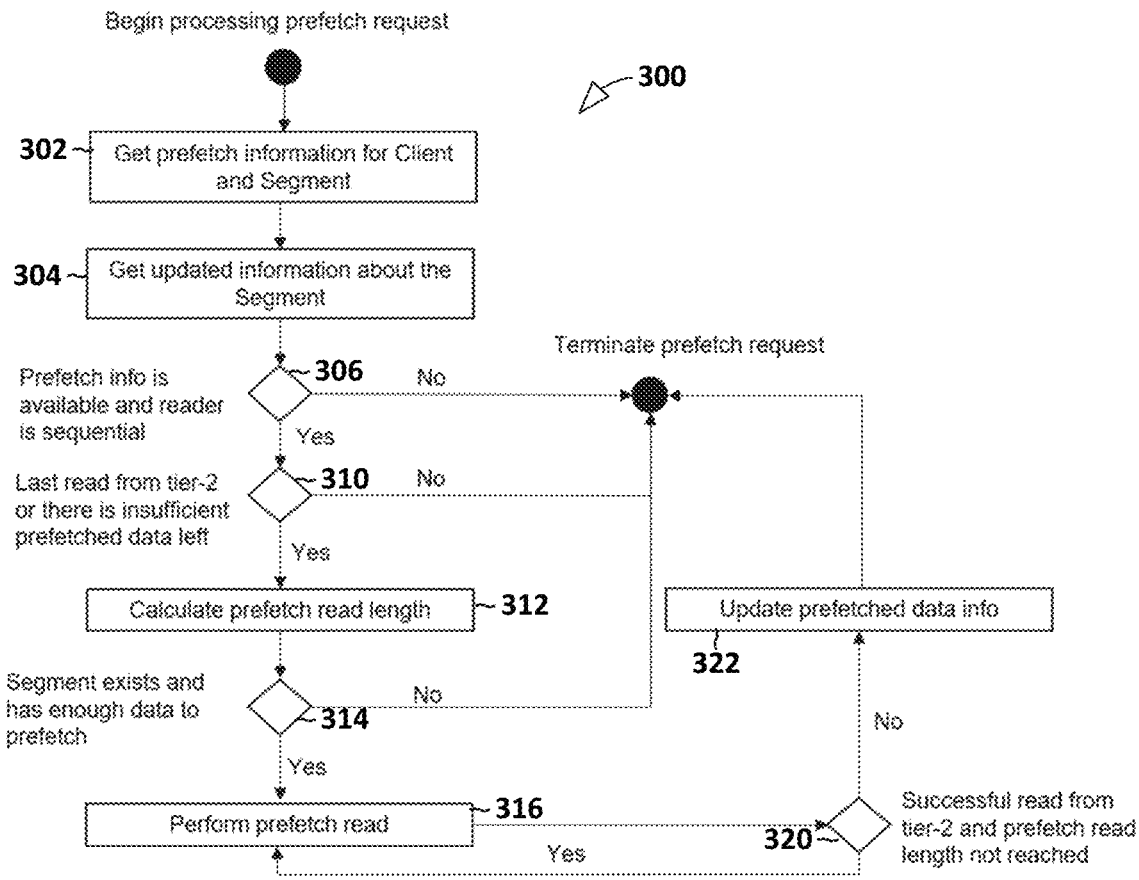
FIG. 3 illustrates a flow diagram of a streaming storage method.

Turning now to FIG. 3, a flow diagram illustrates a streaming storage method 300 in accordance with disclosed features for implementing tiered storage and intelligent prefetching of data from tier 2 storage to improve performance.

The method 300 illustrated in FIG. 3 obtains (block 302) prefetch information for a client and segment associated with a prefetch request. The correct entry for the client and segment may be fetched from the internal data structure in RPM 260. Next (block 304), current segment metadata information may be obtained from the applicable segment container 230. This is important because segments of a stream can be deleted or truncated, which would have a direct impact on whether data may be prefetched from them or not. If (blocks 306) the client and segment pair exists in the internal data structure and it is a sequential reader, method 300 continues. Otherwise, the read prefetch request is discarded.

At operation 310, the illustrated method 300 checks whether the last read from the client comes from tier-2 (instead of Cache) or if there is insufficient prefetched data for this client and segment pair. If either condition applies, method 300 continues. Otherwise, the read prefetch request is discarded.

With the information regarding the client reads on a given segment and the metadata information of that segment, the process calculates (block 312) the offset and length of the prefetch read to execute. If (block 314) the segment has not been deleted nor truncated at a point in which it may impact the prefetch read, the process continues. Otherwise, the process discards the read prefetch request.

RPM 260 may then execute (block 316) the prefetch read against the applicable segment container 230. It continues to do so while reads are successful and the prefetch data length has not been reached, as determined in block 320. Otherwise, the process continues.

After the prefetch read process completes, the process updates (block 322) the new available amount of prefetched data for this client and segment in the data structure of RPM 260.

Figure 4:
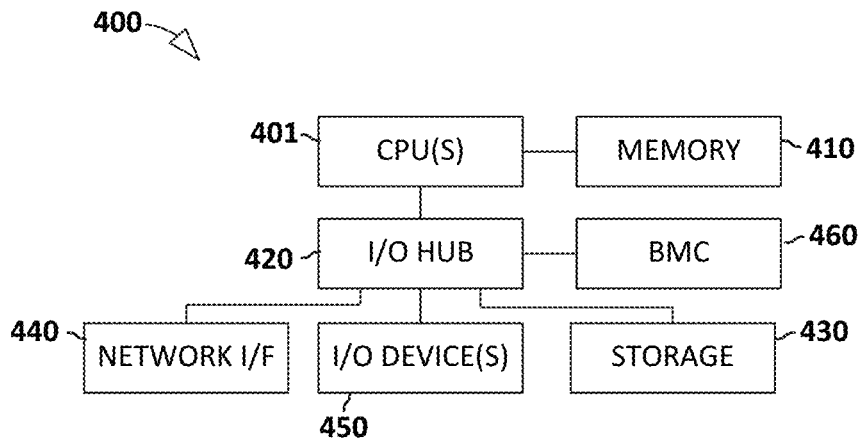
FIG. 4 illustrates an exemplary information handling system suitable for use in conjunction with subject matter illustrated in FIGS. 1-3.

Referring now to FIG. 4, any one or more of the elements illustrated in FIG. 1 through FIG. 4 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A streaming storage system, comprising:
   a segment store to process data requests associated with a data stream, wherein the segment store includes:
   first tier storage for storing a most recent portion of ingested data;
   a cache for storing data served to a client;
   a segment container to:
   execute storage operations for segments allocated to the segment container;
   maintain information indicative of which portions of ingested data are stored in the cache;
   initiate retrieval of data from second tier storage when a data request addresses a segment not currently stored in the first tier storage or the cache;
   monitor and evaluate data request information, wherein evaluation of the data request information includes a determination of whether monitored data requests associated with a particular reader constitute sequential data requests based, at least in part, on stream offsets for successive data requests being less than a predefined prefetch length; and
   responsive to identifying a prefetch trigger based on the data request information, initiate a prefetch read of data stored in the second tier storage.

2. The streaming storage system of claim 1, wherein evaluation of the data request information includes a determination of whether monitored data requests associated with a particular reader constitute sequential data requests.

3. The streaming storage system of claim 2, wherein monitored data requests constitute sequential data requests only if successive data requests target monotonically increasing stream offsets.

4. The streaming storage system of claim 2, wherein no prefetch trigger occurs when the evaluation determines that monitored data requests are associated with a non-sequential reader.

5. The streaming storage system of claim 1, wherein initiating a prefetch comprises initiating a prefetch asynchronously with respect to processing of data requests.

6. The streaming storage system of claim 1, wherein the data request information includes a segment identifier and a reader identifier indicative of a reader associated with a data request.

7. The streaming storage system of claim 1, further comprising a streaming storage controller to process metadata requests associated with the data stream.

8. The streaming storage system of claim 1, wherein a storage latency associated with the first tier storage is lower than a storage latency associated with the second tier storage.

9. The streaming storage system of claim 1, wherein the first tier storage include Apache Bookkeeper storage and the second tier storage comprises Apache Hadoop Distributed File System (HDFS) storage.

10. A streaming storage method, comprising:
    processing, by a segment store of a streaming storage system, data requests associated with a data stream, wherein the segment store includes:
    first tier storage for storing a most recent portion of ingested data;
    a cache for storing data served to a client;
    a segment container to:
    execute storage operations for segments allocated to the segment container;
    maintain information indicative of which portions of ingested data are stored in the cache;
    initiate retrieval of data from second tier storage when a data request addresses a segment not currently stored in the first tier storage or the cache;
    monitor and evaluate data request information, wherein evaluation of the data request information includes a determination of whether monitored data requests associated with a particular reader constitute sequential data requests based, at least in part, on stream offsets for successive data requests being less than a predefined prefetch length; and responsive to identifying a prefetch trigger based on the data request information, initiate a prefetch read of data stored in the second tier storage.

11. The method of claim 10, wherein evaluation of the data request information includes a determination of whether monitored data requests associated with a particular reader constitute sequential data requests.

12. The method of claim 11, wherein monitored data requests constitute sequential data requests only if successive data requests target monotonically increasing stream offsets.

13. The method of claim 11, wherein no prefetch trigger occurs when the evaluation determines that monitored data requests are associated with a non-sequential reader.

14. The method of claim 10, wherein initiating a prefetch comprises initiating a prefetch asynchronously with respect to processing of data requests.

15. The method of claim 10, wherein the data request information includes a segment identifier and a reader identifier indicative of a reader associated with a data request.

16. The method of claim 10, further comprising a streaming storage controller to process metadata requests associated with the data stream.

17. The method of claim 10, wherein a storage latency associated with the first tier storage is lower than a storage latency associated with the second tier storage.

18. The method of claim 10, wherein the first tier storage comprises Apache Bookkeeper storage and the second tier storage comprises Apache Hadoop Distributed File System (HDFS) storage.

* * * * *